US005689808A

United States Patent [19]

Sandahl et al.

[11] Patent Number: 5,689,808

[45] Date of Patent: Nov. 18, 1997

[54] MULTIPLE CHANNEL AUTOMATIC SIMULCAST CONTROL SYSTEM

[75] Inventors: Joel E. Sandahl; Scott A. McFarland; John F. Nagel, all of Quincy, Ill.

[73] Assignee: Motorola, Inc., Schaumburg, Ill.

[21] Appl. No.: 641,367

[22] Filed: Mar. 10, 1994

Related U.S. Application Data

[63] Continuation of Ser. No. 775,623, Oct. 10, 1991, abandoned.

[51] Int. Cl.[6] .......... H04B 7/00

[52] U.S. Cl. .......... 455/51.2; 455/56.1; 375/356

[58] Field of Search .......... 455/49.1, 51.1, 455/51.2, 56.1, 103, 105, 53.1, 70, 71; 375/356, 357, 362, 363

[56] References Cited

U.S. PATENT DOCUMENTS

| | | | |
|---|---|---|---|
| 5,014,344 | 5/1991 | Goldberg | 455/51.2 |
| 5,031,230 | 7/1991 | Sandahl et al. | 455/50 |
| 5,117,424 | 5/1992 | Cohen et al. | 370/105.5 |
| 5,127,101 | 6/1992 | Rose, Jr. | 455/51.1 |
| 5,201,061 | 4/1993 | Goldberg et al. | 455/51.2 |
| 5,218,717 | 6/1993 | Reitberger | 455/51.2 |
| 5,220,676 | 6/1993 | LoGalbo et al. | 455/51.2 |
| 5,257,404 | 10/1993 | Goreham et al. | 455/51.2 |

FOREIGN PATENT DOCUMENTS 0 197 556 10/1986 European Pat. Off. .

OTHER PUBLICATIONS

C–Net Platinum Advanced Paging Network, Sep. 1991.

*Primary Examiner*—Chi H. Pham

*Attorney, Agent, or Firm*—Philip P. Macnak

[57] ABSTRACT

Apparatus for effecting simulcast data broadcasting includes a source of information, a network control unit, and a plurality of transmitters. The network control unit includes a high-stability timebase which is coupled to the source of information to produce a signal clocked from the high-stability timebase and containing data and digital identifying information. Each of the plurality of transmitters is coupled to the network control unit to receive the signal, and each has a modulation-generating timebase. Each modulation-generating timebase is phase locked to the high-stability timebase by way of synchronization information included in the signal, and each is adjusted by a corresponding correction value provided by the network control unit, thereby providing a highly accurate coincident modulation of the plurality of transmitters during a radio broadcast containing the signal.

26 Claims, 14 Drawing Sheets

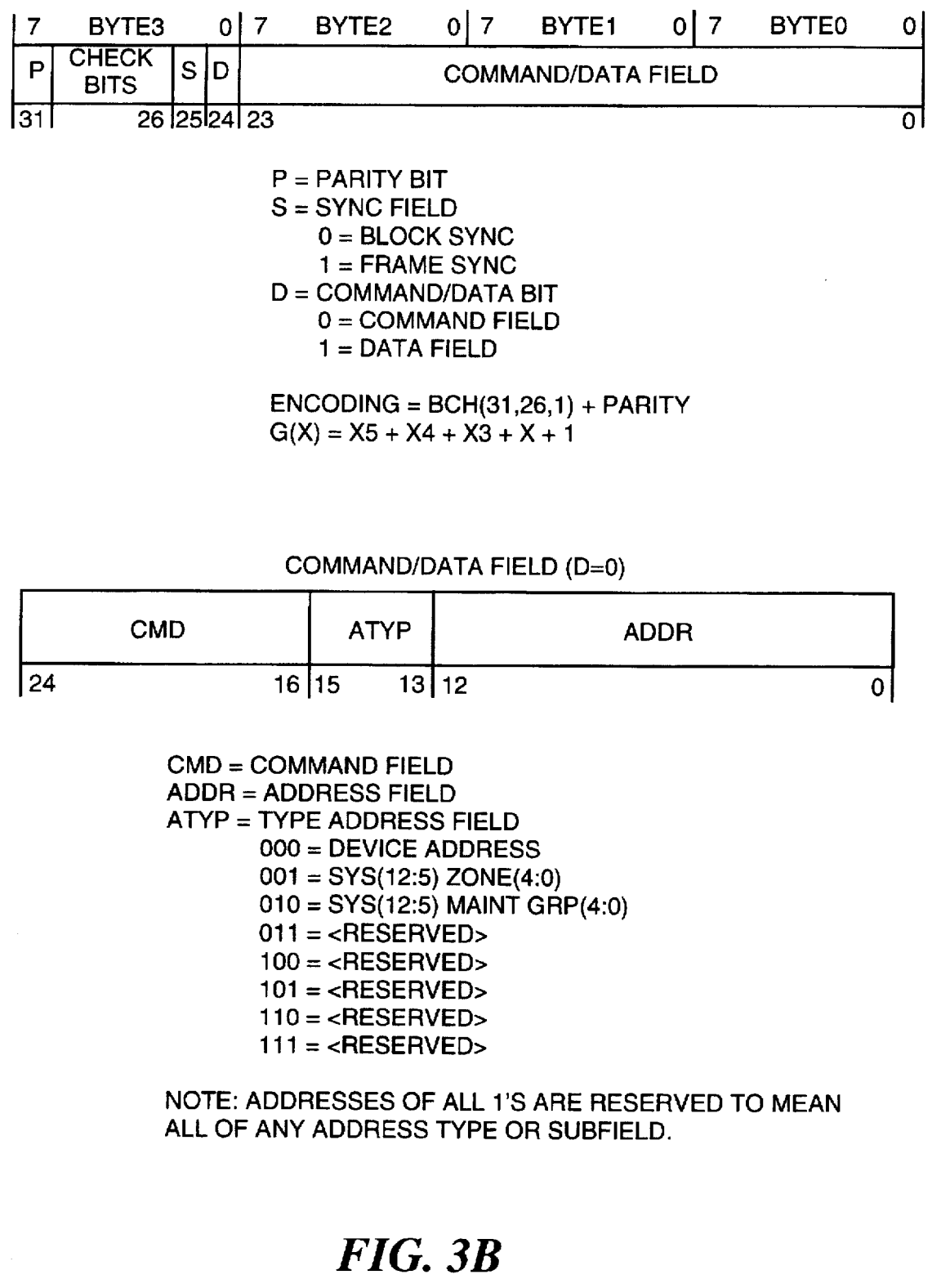

| 7 BYTE3 0 | | | | 7 BYTE2 0 | 7 BYTE1 0 | 7 BYTE0 0 |
|---|---|---|---|---|---|---|
| P | CHECK BITS | S | D | COMMAND/DATA FIELD | | |
| 31 | 26 | 25 | 24 | 23 | | 0 |

P = PARITY BIT
S = SYNC FIELD
    0 = BLOCK SYNC
    1 = FRAME SYNC
D = COMMAND/DATA BIT
    0 = COMMAND FIELD
    1 = DATA FIELD

ENCODING = BCH(31,26,1) + PARITY
G(X) = X5 + X4 + X3 + X + 1

COMMAND/DATA FIELD (D=0)

| CMD | ATYP | ADDR |
|---|---|---|
| 24 — 16 | 15 — 13 | 12 — 0 |

CMD = COMMAND FIELD
ADDR = ADDRESS FIELD
ATYP = TYPE ADDRESS FIELD
    000 = DEVICE ADDRESS
    001 = SYS(12:5) ZONE(4:0)
    010 = SYS(12:5) MAINT GRP(4:0)
    011 = <RESERVED>
    100 = <RESERVED>
    101 = <RESERVED>
    110 = <RESERVED>
    111 = <RESERVED>

NOTE: ADDRESSES OF ALL 1'S ARE RESERVED TO MEAN ALL OF ANY ADDRESS TYPE OR SUBFIELD.

*FIG. 3B*

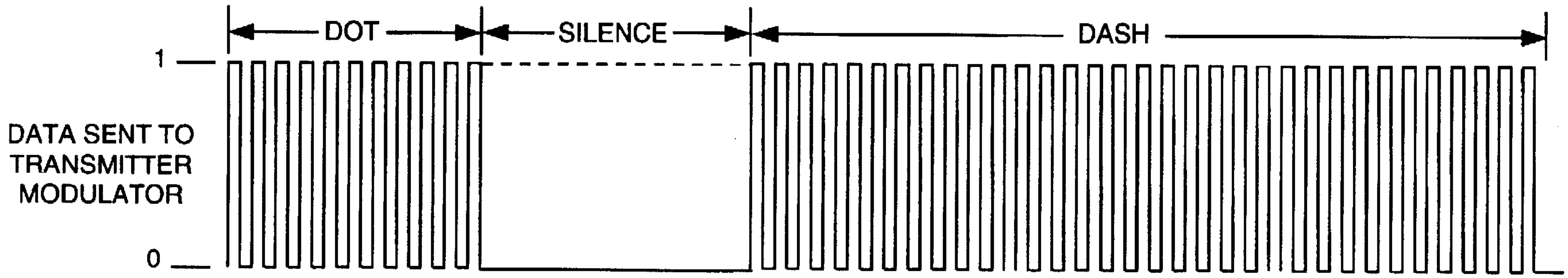

1. STATION IDENTIFICATION CALL SIGN AND MORSE CODE GENERATION CAPABILITY RESIDENT IN EQUIPMENT AT THE TRANSMITTER SITE.
2. "DOTS" AND "DASHES" PRODUCED BY DATA TRANSMISSION SEQUENCE OF ALTERNATING "1" AND "0" DATA PATTERN TO THE TRANSMITTER MODULATOR.
3. SILENCE BETWEEN "DOTS" AND "DASHES" PRODUCED BY STEADY "1" OR "0" DATA PATTERN.
4. TONE AND SILENCE INTERVAL SET BY NUMBER OF DATA BITS IN PATTERN.
5. TONE FREQUENCY SET BY DATA TRANSMISSION RATE (FREQUENCY EQUAL TO ONE HALF).
6. DATA TRANSMISSION RATE SELECTED TO NOT INTERFERE WITH NORMAL DATA SIGNALLING SENT ON RADIO CHANNEL. USE RATE SUCH AS MEASUREMENT DATA MESSAGE RATE.

*FIG. 10*

NMU MEASUREMENT ALGORITHM AND POLYNOMIAL:

$$\left[\frac{\text{SYNC-135,000}}{1000} \text{ X } 1000\right] + \left[\frac{\Sigma(\text{BIT\%1000}) - 500}{N}\right]$$

WHERE: SYNC IS SYNC PULSE MEASUREMENT VALUE
BIT IS DATA MESSAGE BIT MEASUREMENT VALUE
N IS THE NUMBER OF BIT MEASUREMENTS TAKEN
135,000 IS THE EXPECTED SYNC TIME INTO MESSAGE
1000 IS THE PERIOD OF A MESSAGE BIT
500 IS HALF OF THE PERIOD OF A MESSAGE BIT
% IS THE MODULO DIVISION OPERATOR
ALL MEASUREMENTS ARE ASSUMED IN MICROSECONDS
ALL MATH IS INTEGER

EXAMPLE OF NMU MEASUREMENTS & NIU ADJUSTMENTS

| NMU | SLOT | DEVICE | MEASUREMENT | AIR | RADIATED | ADJUSTMENT |
|---|---|---|---|---|---|---|
| 1 | 1 | 0001 | 1016 | 20 | 996 | |
| 1 | 2 | 0002 | 11356 | 27 | 11329 | |
| 1 | 3 | 0003 | 6534 | 42 | 6492 | |
| 1 | 4 | 0004 | 102 | 50 | 52 | |
| 2 | 1 | 0005 | 3412 | 46 | 3366 | |
| 2 | 2 | 0006 | 10519 | 16 | 10513 | |
| 2 | 3 | 0007 | 528 | 23 | 525 | |
| 2 | 4 | 0004 | 7763 | 42 | 7721 | |

WITH NMU #2 MEASUREMENTS NORMALIZED TO NMU #1 USING THE COMMON DEVICE #0004 AND ADDING ADJUSTMENT VALUES TO THE TABLE:

| | | | | | | |
|---|---|---|---|---|---|---|
| 1 | 1 | 0001 | 1016 | 20 | 996 | -996 |
| 1 | 2 | 0002 | 11356 | 27 | 11329 | -11329 |
| 1 | 3 | 0003 | 6534 | 42 | 6492 | -6492 |
| 1 | 4 | 0004 | 102 | 50 | 52 | -52 |
| 2 | 1 | 0005 | -4249 | 46 | -4295 | 4295 |
| 2 | 2 | 0006 | 2858 | 16 | 2852 | -2852 |
| 2 | 3 | 0007 | -7133 | 23 | -7136 | 7136 |
| 2 | 4 | 0004 | 102 | 42 | 60 | -60 |

WITH THE INDICATED ADJUSTMENTS TO THE ASSOCIATED NIU CLOCKS, ALL TRANSMITTERS WILL BE SYNCHRONIZED WITH THE CLOCK IN NMU #1.

*FIG. 11*

TITLE ____________________

PARTS LIST CASE NO. __________

| | | | |
|---|---|---|---|
| 10 | 5 | 60 | |
| 12 | | 62 | |
| 14 | 10 | 64 | |
| 16 | | 66 | |
| 18 | | 68 | PAGING RECEIVER PR |
| 20 | 15 PAGING TERMINAL PT | 70 | “ |
| 22 | “ | 72 | |
| 24 | 20 “ | 74 | |
| 26 | NETWORK CONTROL UNIT NCU | 76 | PAGING MONITOR Rcvr RCVR |
| 28 | | 78 | “ |
| 30 | 25 LINK SYSTEM | 80 | REGION |
| 32 | NETWORK INTERFACE UNIT NIU | 82 | NETWORK MONITOR UNIT NMU |
| 34 | 30 “ | 84 | “ |
| 36 | “ | 86 | |
| 38 | “ | 88 | LINE |
| 40 | 35 “ | 90 | LINE |
| 42 | “ | 92 | |
| 44 | 40 “ | 94 | |
| 46 | | 96 | |
| 48 | | 98 | |
| 50 | 45 PAGING Xmtr XMTR | 100 | |
| 52 | “ | 102 | |
| 54 | 50 “ | 104 | |
| 56 | “ | 105 | |
| 58 | “ | 106 | |

*FIG. 12*

MULTIPLE CHANNEL AUTOMATIC SIMULCAST CONTROL SYSTEM

This is continuation, of application Ser. No. 07/775,623, filed Oct. 10, 1991.

FIELD OF THE INVENTION

This invention relates to operating multiple radio transmitter systems where the radio transmitters simultaneously broadcast (simulcast) common modulation information at the same time to electromagnetic wave receivers that may be located in overlapping areas of radio transmission.

DESCRIPTION OF THE PRIOR ART

In radio systems, radio transmitters can communicate with radio receivers over only finite distances. To transmit signals to receivers over arbitrarily large geographic areas, multiple radio transmitters are required. Radio transmitter locations are selected to provide the desired geographic coverage. To provide efficient signalling, it is often desirable to simultaneously broadcast (simulcast) signalling information from all of the radio transmitters geographically dispersed throughout the coverage area. Invariably, these systems result in having the transmissions from one radio transmitter overlap the transmissions of one or more other radio transmitters over some common geographic areas. Left uncontrolled, these transmissions result in destructive interference in the overlapping regions. Simulcast transmission techniques provide for the minimization of such destructive interference through the precise control of radio transmitter modulation and radio transmitter carrier frequencies. Effective simulcasting requires that the modulation and carrier frequencies of all overlapping radio transmissions have a precise relationship with respect to each other.

With respect to modulation, it is fundamentally important that all radio transmitters provide coincident modulation in terms of time and amplitude (modulation index). With respect to carrier frequencies, the desired frequency relationship between radio transmitters is a function of the type of modulating signal and various system design considerations. Independently of these specific factors, all simulcast systems require that the carrier frequencies of the radio transmitters be maintained to within a close tolerance of some desired setting.

Inherent in all simulcast systems is the need to connect the common signal originating at the control point, from which modulation is derived, to each of the geographically dispersed radio transmitters and their associated control equipment. This system of connections is commonly referred to as the "link system." The connection from the common control point to any given radio transmitter site is referred to as the "link path" for that site. Link systems comprise various transmission media including wire lines, radio, satellite, microwave or a combination of the foregoing. In order to achieve the wide geographic coverage required by modern simulcast systems, the link systems are often very costly to build and install. Furthermore, radio links are frequently preferred but, due to limited radio frequency spectrum, are often unavailable. Many existing link systems are limited to one-way operation.

The need for modulation control results primarily from the fact that the various link paths employed in the link system do not provide transmission characteristics over time that are constant, either from unit to unit or within the same unit. Differences in the link path, including noise and bit errors, which are passed through as differences in modulation from transmitter to transmitter, result in the loss of coincidence in modulation and, consequently, in destructive interference.

One method of modulation control is "synchronization." In synchronized systems, each transmission site is equipped with some form of synchronizing clock. The signalling information from the control point is coded for transmission to begin at a specific moment with respect to the synchronizing clock at the transmission sites. When that moment occurs, the transmitter control equipment begins to generate modulation information from stored signalling information using its local timebase. Currently, the timebases for such systems are independent oscillators. This necessitates not only initial synchronization of all clocks at all sites, but also periodic resynchronization. Today, there are two fundamental methods for achieving synchronization: external synchronization and site-to-site synchronization. In the case of external synchronization, an external synchronization pulse is introduced from some stable external source such as "on-time" pulses from the 60-kHz radio station WWVB of the National Bureau of Standards or the Geopositioning Satellite (GPS) satellite receiver. While this method of operation has the disadvantage of being dependent on the availability of an external signal source, it is commercially important to support some system of external synchronization. In site-to-site synchronization, such as is described in U.S. Pat. No. 4,718,109 by Breeden et al., the system is disabled while a synchronization pulse is passed from site to site. This method of operation has two disadvantages. First, synchronization error builds up as the pulse passes from site to site. Second, as the system becomes arbitrarily large in terms of geographic coverage, the time the system is disabled becomes arbitrarily large, limiting the use of the radio channel for communications.

Various methods are used to control transmitter carrier frequency. The commonest type of carrier frequency control is some form of high-accuracy oscillator, such as a high-quality quartz oscillator or an atomic standard. Quartz oscillators have the disadvantage of requiring routine calibration against an absolute standard. While atomic standards effectively eliminate routine recalibration, they are very expensive.

Current simulcast control systems precede signalling information with command bursts. If the command burst is destroyed by noise or other transmission impairments, all subsequent signalling information is lost by the receiving transmitter site until a new command burst is sent and received. In busy systems, the mean time between command bursts can span many minutes, during which time the transmitter is down.

Most simulcast systems are required to transmit radio station call signs. These transmissions are typically transmitted in Morse Code. A system that incorporates a large number of transmitters can thus be required to transmit a significant number of independent call signs. To transmit these call signs, the system must be disabled from a communications standpoint for an extended period of time. Further, some systems may only have digital modulation capability in the future.

The essential nature of the communications carried by many simulcast systems requires a high degree of system availability. This encourages the accommodation of alternate linking mechanisms if the primary link system fails.

The software-intensive nature of modern equipment design and the ongoing evolution of new product features dictate the need for a mechanism in the control equipment for rapid reprogramming of control equipment to use future software releases. This becomes particularly important when it is remembered that controllers are installed at transmitter sites over a wide geographic area.

SUMMARY OF THE INVENTION

In accordance with a first aspect of the present invention, an apparatus for effecting simulcast broadcasting of signals comprises a source of information, a network control unit, a plurality of transmitters, a receiver, and a network monitor unit. The network control unit is connected to the source of information to produce a signal containing digital identifying information. Each of the plurality of transmitters is connected to the network control unit and receives the signal from the network control unit which is simulcast via a radio broadcast. The receiver is located to receive the simulcast radio broadcasts. The network monitor unit is connected to the receiver and to the network control unit to supply information to the network control unit to control the radio simulcast broadcast.

In accordance with a second aspect of the present invention, an apparatus for effecting simulcast broadcasting of signals includes a source of information, a clock, a network control unit, a plurality of transmitters, a network interface unit, a receiver, and a network monitor unit. The clock provides a master timebase to the apparatus. The network control unit is connected to the source of information to produce a signal containing digital identifying information and timing information derived from the clock for broadcast of the signal in a forward link system. Each of the plurality of transmitters is connected to the network unit to receive the signal from the network control unit which is simulcast via a radio broadcast containing the signal at a frequency controlled by the timing information, wherein a master timebase of the signal received from the network control unit is phase locked with a local timebase residing at each one of the plurality of transmitters. The network interface unit is connected between each of the transmitters and the network control unit. The receiver is located to receive the simulcast radio broadcasts, and a network monitor unit is connected to the receiver and to the network control unit to supply information to the network control unit to control the radio simulcast broadcast, including control of the frequency of the simulcast broadcast to maintain frequency synchronization, wherein a timebase at the network monitoring unit is derived from phase locking a local clock at the network monitoring unit with the master timebase at the network control unit.

In accordance with a third aspect of the present invention, a method for synchronizing a broadcast in a simulcast broadcasting system having a plurality of remote transmitters, includes the steps of:

at a network controller unit:

- receiving a source of information from a plurality of inputs;
- clocking the source of information with a high stability clock reference to provide clocked information to the plurality of remote transmitters;
- sending adjustment commands during a maintenance cycle to the remote transmitters after one of a plurality of network monitoring units detects a phase difference between a timebase at the network monitoring unit and a timebase at one of the remote transmitters, wherein the timebase at the remote transmitters and the network monitoring units are each individually derived from the high stability clock reference at the network controller unit;

at each of plurality of network monitoring units:

- monitoring and measuring synchronization between the timebase at one of the plurality of remote transmitters in a non-simulcast, non-interfering basis, wherein measurements are taken by assigned measurement time slots; and sending an adjustment signal to the network controller unit in response to the detection of the phase difference between the timebase at the network monitoring unit and the timebase at the transmitter being monitored, wherein the network controller unit sends the adjustment command to the transmitter being monitored in response to the adjustment signal from the network monitoring unit.

In accordance with a fourth aspect of the present invention, a simulcast broadcasting system comprises a plurality of geographically dispersed radio transmitters providing simultaneous broadcasting of common modulation; a network controller unit; a network monitoring unit; a plurality if interface units; a local timebase at the network controller unit, the network interface unit, and the network monitoring unit; and a forward synchronizing means. The network controller unit is coupled to the geographically dispersed radio transmitters and provides overall control of the simulcast broadcasting system via a link system. The network monitoring unit has an associated receiver for monitoring each of the plurality of radio transmitters. The plurality of network interface units forms part of the link system, where each one of the plurality of network interface units resides at each one of the corresponding plurality of geographically dispersed radio transmitters. The network monitoring unit measures the relative synchronization between the timebase at the network interface units and the timebase at the network monitoring unit and provides an adjustment signal to the network controller unit. The forward synchronizing means synchronizes a given transmitter associated with a given network interface unit in response to the adjustment signal received at the network controller unit.

In accordance with a fifth aspect of the present invention, a method for synchronizing a broadcast in a simulcast broadcasting system having a plurality of remote transmitters, comprises the steps of:

at a network controller unit:

- receiving a source of information from a plurality of inputs;
- clocking the source of information with a high stability clock reference to provide clocked information to the plurality of remote transmitters;
- sending adjustment commands during a maintenance cycle to the remote transmitters after one of a plurality of network monitoring units detects a phase difference between a timebase at the network monitoring unit and a timebase at one of the remote transmitters, wherein the timebase at the remote transmitters and the network monitoring units are each individually derived from the high stability clock reference at the network controller unit; and at each of plurality of network monitoring units:

- monitoring and measuring synchronization between the timebase at one of the plurality of remote transmitters in a non-simulcast, non-interfering basis, wherein measurements are taken by assigned measurement time slots; and
- sending an adjustment signal to the network controller unit in response to the detection of the phase difference between the timebase at the network monitoring unit and the timebase at the transmitter being monitored, wherein the network controller unit sends the adjustment command to the transmitter being monitored in response to the adjustment signal from the network monitoring unit.

In accordance with a sixth aspect of the present invention, an apparatus for effecting simulcast broadcasting of data comprises a source of information, a network control unit, and a plurality of transmitters. The network control unit has a high-stability timebase which is coupled to the source of information to produce a signal containing data and digital identifying information, the signal is clocked from the high-stability timebase. Each of the plurality of transmitters is coupled to the network control unit to receive the signal, and each has a modulation-generating timebase. Each modulator-generating timebase is phase locked to the high-stability timebase by way of synchronization information included in the signal, and each modulation-generating timebase is adjusted by a corresponding correction value provided by the network control unit, thereby providing a highly accurate coincident modulation of the plurality of transmitters during a radio broadcast containing the signal.

In accordance with a seventh aspect of the present invention, a method for effecting simulcast broadcasting of data comprises the steps of:

providing a source of information for a network control unit;

synchronizing the network control unit to a high stability timebase;

generating a signal, at the network control unit, containing data and digital identifying information, the signal clocked by the high-stability timebase;

providing to a plurality of transmitters the signal, the plurality of transmitters each having a modulation-generating timebase;

phase locking, at the plurality of transmitters, each modulation-generating timebase to the high-stability timebase by way of synchronization information included in the signal; and adjusting each modulation-generating timebase by a corresponding correction value provided by the network control unit, thereby providing a highly accurate coincident modulation of the plurality of transmitters during a radio broadcast containing the signal.

BRIEF DESCRIPTION OF THE DRAWINGS

The features of the invention which are believed to be novel are set forth with particularity in the appended claims. The invention itself, together with its further objects and advantages thereof, may be best understood by reference to the following description when taken in conjunction with the accompanying drawings, in several figures of which like reference numerals identify identical elements, in which:

FIGS. 3*a–c* are drawings of successive expansions of the layout of a signal to be broadcast as a high-speed data stream provided by the preferred embodiment of the present invention.

FIG. 10 is a timing diagram of the digital Morse Code generation provided by the preferred embodiment of the present invention.

FIG. 11 is a listing of an NMU Measurement Algorithm and Polynomial and a tabulation of NMU measurements and adjustments.

DETAILED DESCRIPTION OF THE INVENTION

Figure 1:
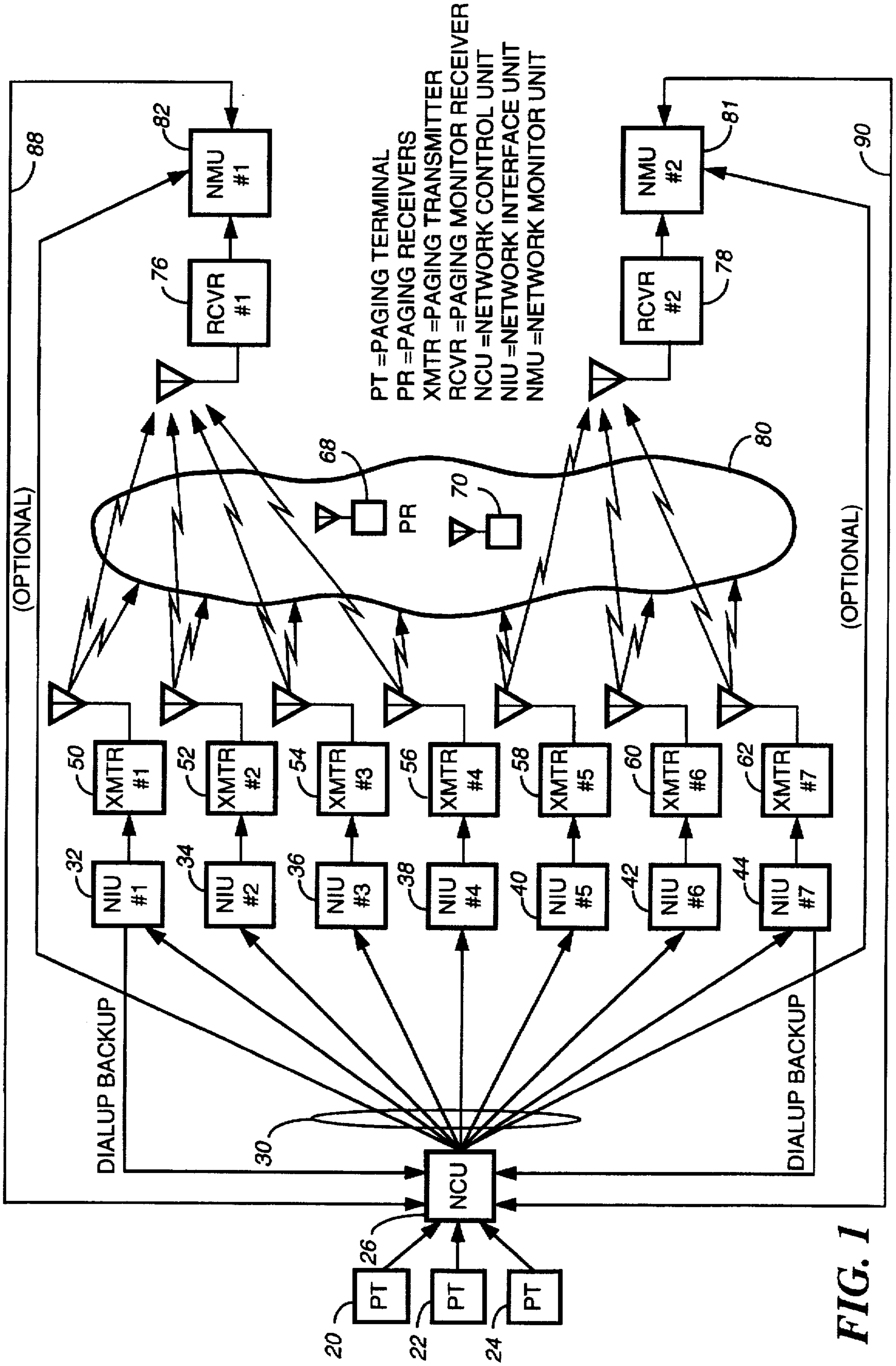
FIG. 1 is an overall system diagram for a radio paging system provided by the preferred embodiment of the present invention.

FIG. 1 is an overall system diagram of an embodiment of the present invention as it is applied to a radio paging system. In particular, FIG. 1 shows three Paging Terminals (PT) 20, 22, and 24 being serviced by one Network Control Unit (NCU) 26 which is connected via a Link System 30 to seven Network Interface Units (NIU) 32–44 which have seven associated Paging Transmitters (XMTRs) 50–62. It should be understood that, while the present invention is described in terms of paging terminals and is particularly effective when used with paging terminals, it could be used equally as well with any source of information to be simulcast, including coded sources.

The seven Paging Transmitters 50–62 are transmitting radio signals to a plurality of Paging Receivers (PR), only two of which, PR 68 and PR 70 are shown, and to two Paging Monitor Receivers (RCVRs) 76 and 78. The region 80 is indicated as an area that is to be served by the Paging Transmitters 50–62. Each of the Paging Monitor Receivers (RCVRs) 76 and 78 is connected to an associated Network Monitor Unit (NMU) 82 and 84 respectively. The NMU 82 is connected to the NCU 26 by a line 88 and the NMU 84 is connected to the NCU 26 by a line 90. The lines 88 and 90 may be Dialup or dedicated telephone lines.

The Paging Monitor Receivers 82 and 84 are shown here outside the region 80, which is possible since they can be sited to be more sensitive than the typical pager, but it should be obvious that they could equally as well be inside the region 80.

The system of FIG. 1 provides several advantages. It provides for efficient use of a link system by permitting multiple signalling sources and associated radio transmission facilities to share a single link system. It permits accurate modulation coincidence for simulcast operation of radio transmission facilities by synchronizing the modulation of all of the radio transmitters and properly controlling link-induced errors. It provides precise control of the carrier frequencies of the transmitters by providing a coordinated frequency standard to all the radio transmitters. It provides efficient identification of radio stations by concurrently transmitting dissimilar call sign. It provides increased system reliability by providing a pre-synchronized alternative link path. Finally, it provides the possibility of rapid reprogramming of controllers to accommodate future software releases. The methods and means of providing these advantages will appear in the description.

Figure 2:
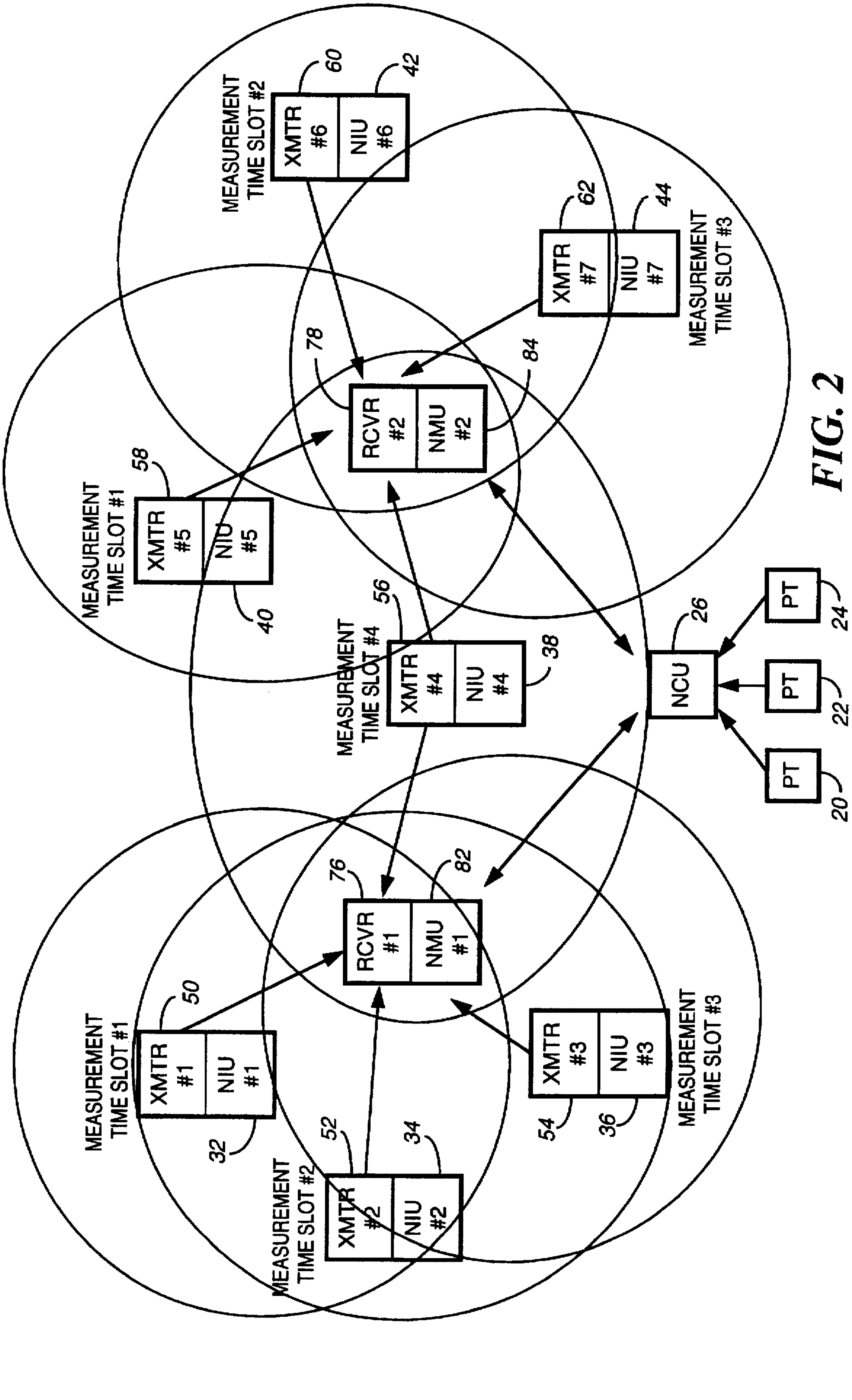
FIG. 2 is an idealized geographic representation of the system of FIG. 1.

FIG. 2 is an idealized geographic representation of the system of FIG. 1. In FIG. 2, the Paging Terminals 20, 22, and 24 are connected as in FIG. 1 to the Network Control Unit 26. The terminals 20, 22, and 24 may be located at the unit 26 or they may be separated from it. Each transmitter 50–62 is surrounded in FIG. 2 by an ellipse that represents the communication range of the associated transmitters (XMTRs) to monitor receivers (RCVR) and also to reach individual paging receivers such as paging receivers 68 and 70 of FIG. 1. Of the seven XMTRs and two RCVRs shown, all XMTRs can communicate with at least one RCVR, meeting the first requirement. For the two RCVRs, XMTR 56 (#4) can communicate with both RCVR 76 (#1) and RCVR 78 (#2), meeting the second requirement. The NCU periodically initiates synchronization measurements. Synchronization measurements, however, cannot be performed as simulcast transmissions. Therefore, the transmissions must be separated in time. The present invention accomplishes this by assigning Measurement Time Slots for this purpose. To minimize the period of time that the simulcast system is disabled to perform such measurements, each transmitter via its associated NIU is assigned a Measurement Time Slot. The time slots are reused on a non-interfering basis. Referring to FIG. 2, Measurement Time Slot #1 is assigned to XMTR 50 (#1) and XMTR 58 (#5), since these two do not interfere. Similarly, XMTR 52 (#2) and XMTR 60 (#6) share Measurement Time Slot #2 and XMTR 54 (#3) and XMTR 62 (#7) share Measurement Time Slot #3. In all instances, the simultaneous operation of these pairs of XMTRs will not result in interference as communication is only possible with different RCVRs. In effect, the geographic separation of the XMTRs permits parallel processing by independent RCVR-NMUs. In practical terms, this feature limits the measurement time for the system to an arbitrarily small amount of time, no matter how many transmitters there are in the system.

Figure 3A:
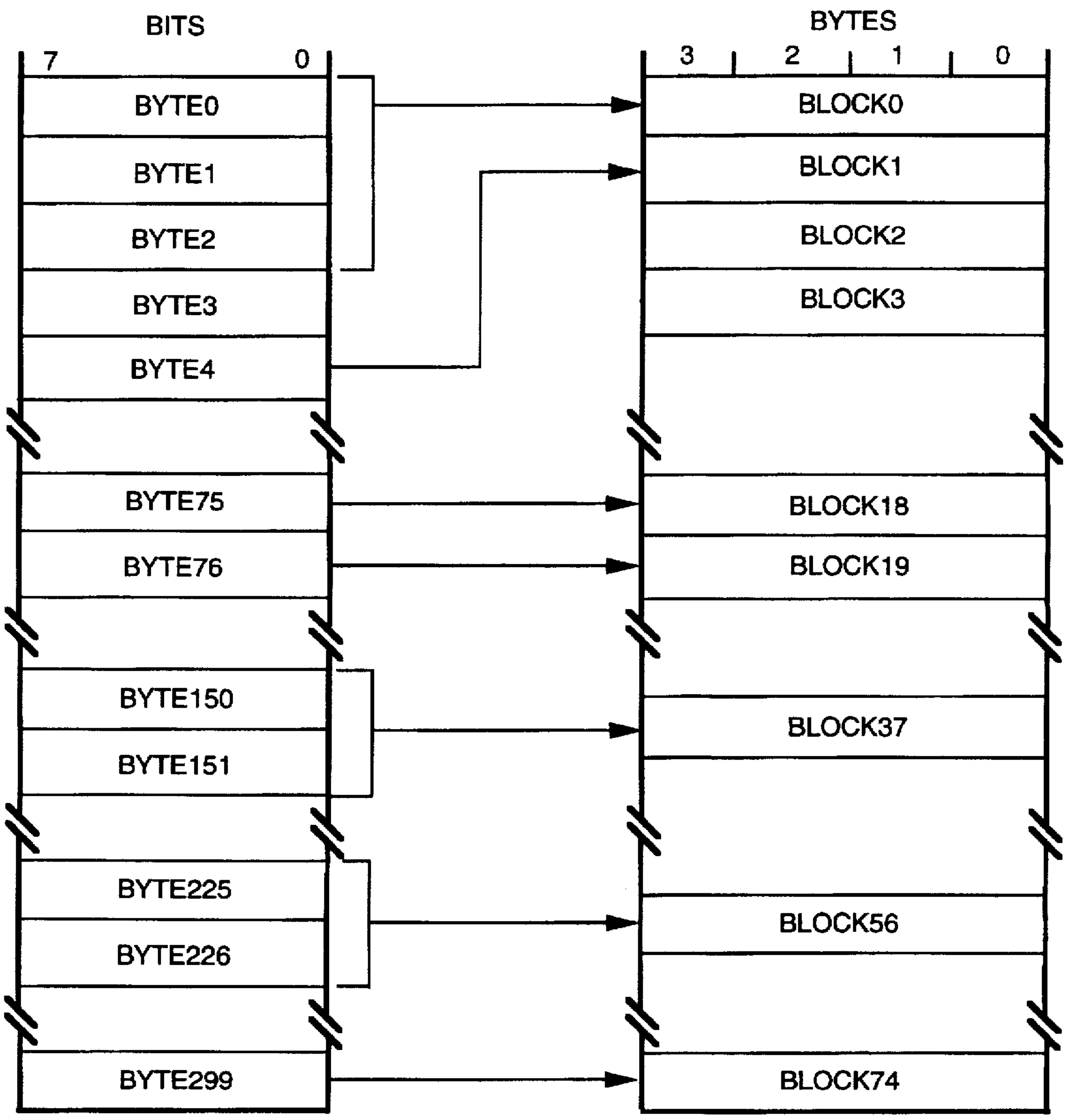
Figure 3C:
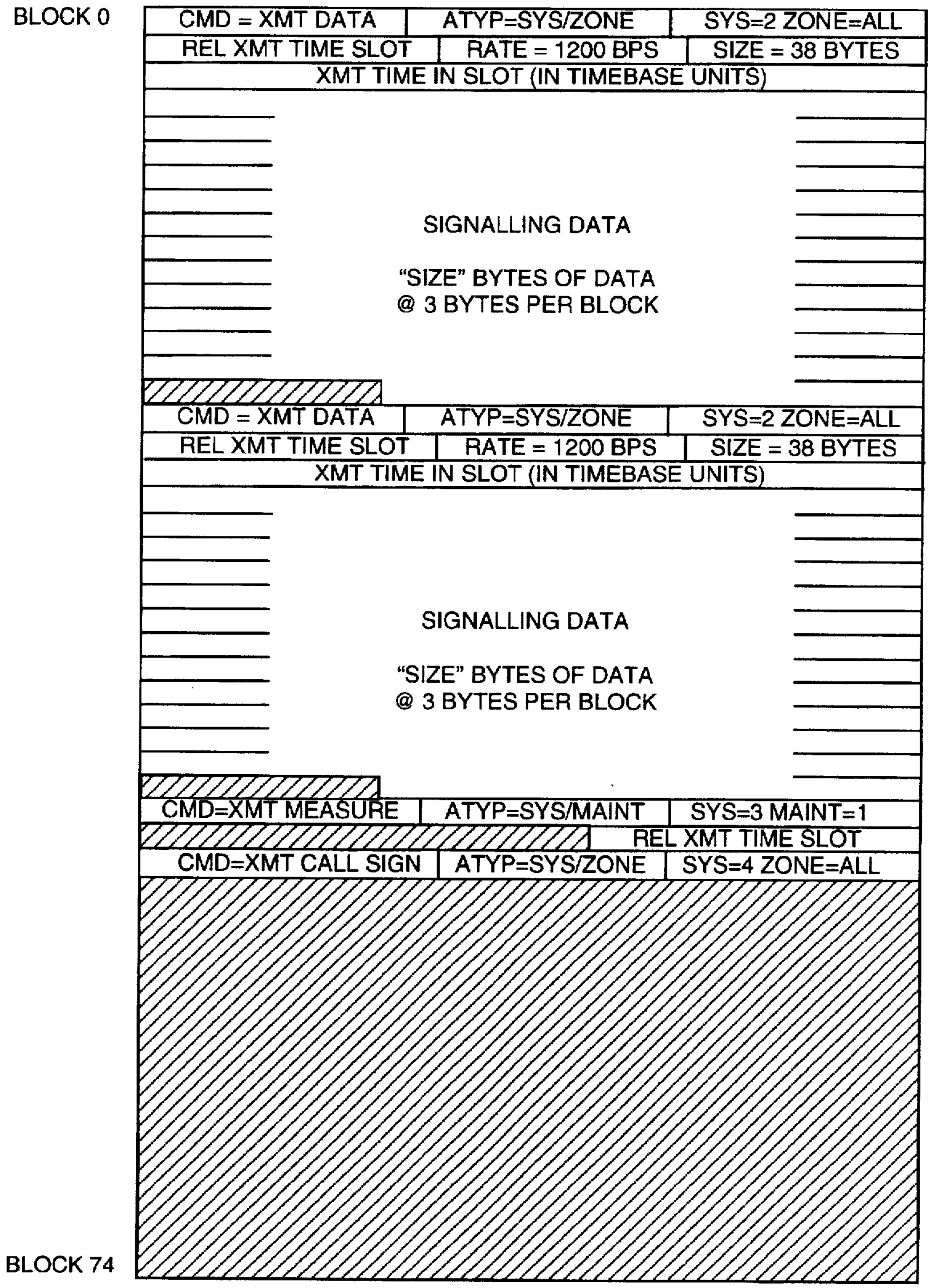

FIGS. 3a, 3b, and 3c are successive expansions of the layout of a signal to be broadcast, showing the characterizing data and the space for signalling data. The characterizing data differs from receiver to receiver depending on the position of the receiver, and it contains both location information (enabling an appropriate delay for simulcast) and also error-correction information comprising forward error correction.

Figure 4:
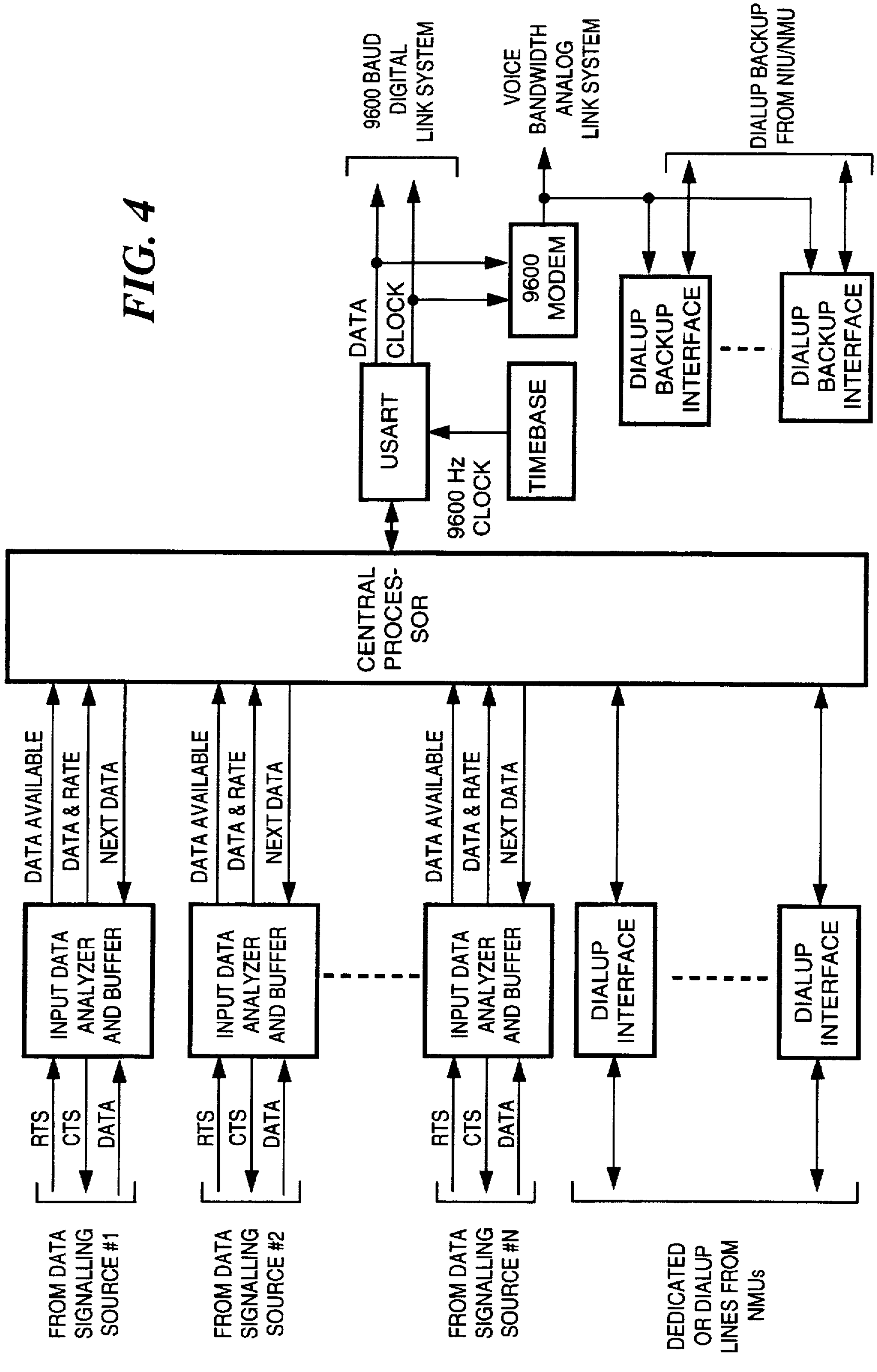
FIG. 4 is a block diagram of the Network Control Unit (NCU) provided by the preferred embodiment of the present invention.
Figure 5:
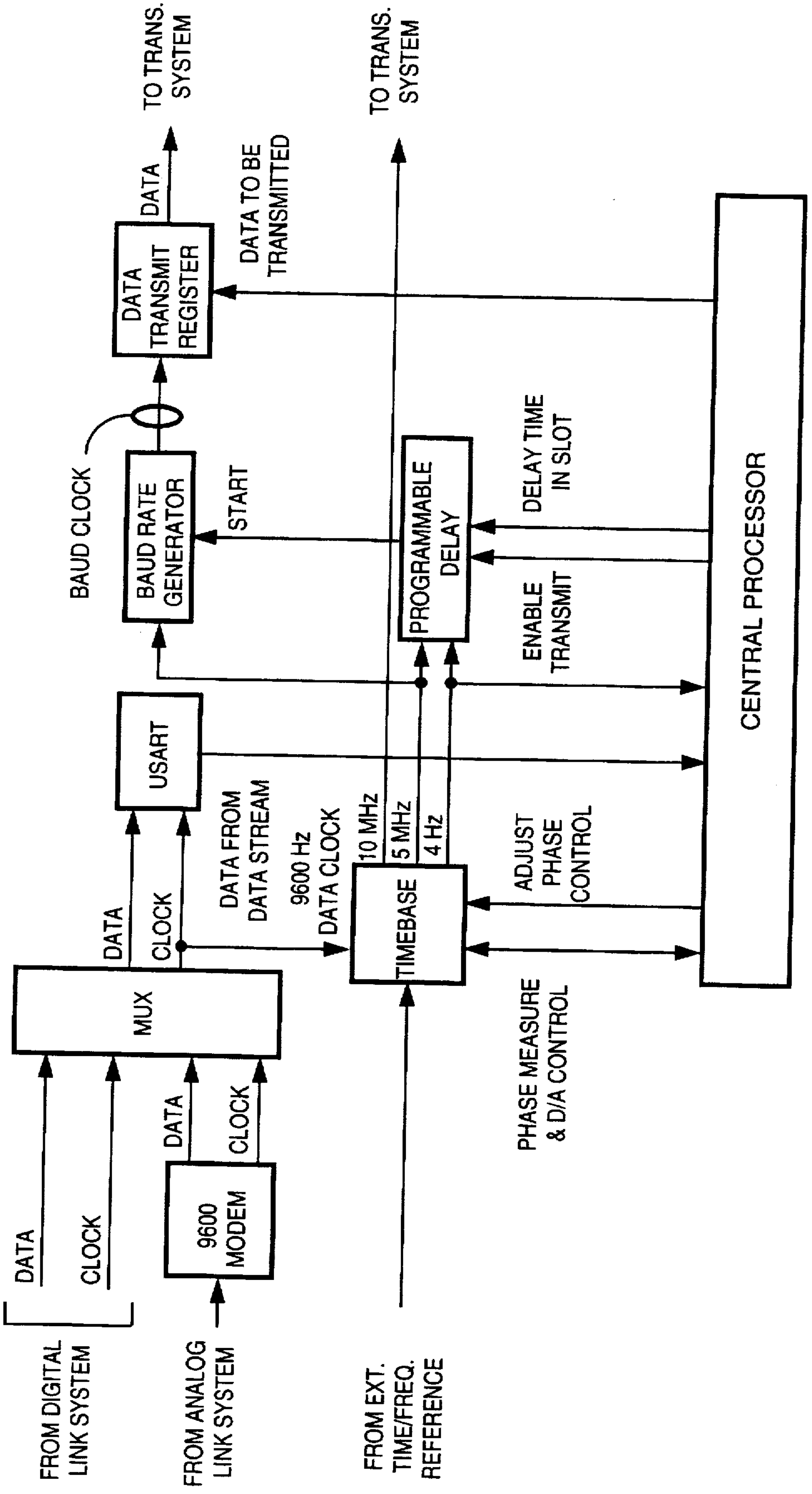
FIG. 5 is a block diagram of the Network Interface Unit (NIU) provided by the preferred embodiment of the present invention.
Figure 7:
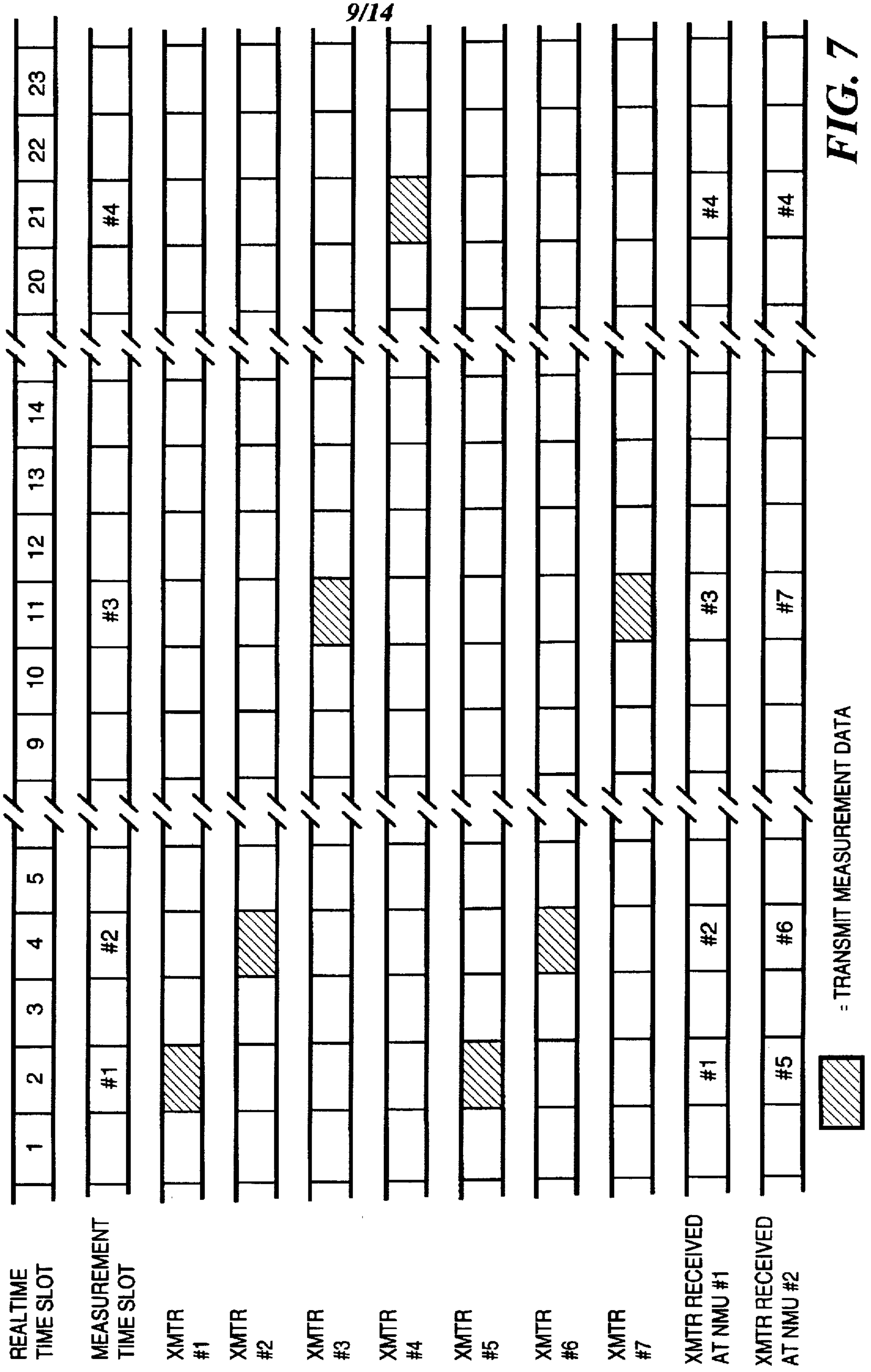
FIG. 7 is a timing diagram for modulation synchronization measurement provided by the preferred embodiment of the present invention.

FIG. 4 is a block diagram of the network control unit of FIGS. 1 and 2, and FIG. 5 is a block diagram of the network interface unit. In the prior art, synchronization is accomplished by transmitting measurement messages from transmitter to transmitter in ever enlarging circles. As the geographic coverage of such systems grows, so does the systemwide synchronization time. Further, measurement errors and subsequent synchronization errors are multiplied as messages are propagated forward. The maximum measurement error for the present invention is limited to the sum of the only two measurements ever used for synchronization. The timed relationships of the synchronization measurements for the present invention as illustrated in FIGS. 1 and 2 is shown in FIG. 7. As can be seen in FIG. 7, XMTRs #1 and #5 are activated at the same time. During that same period in time, NMU #1 receives only XMTR #1 and NMU #2 receives only #5. Conversely, XMTR #4 is the only XMTR activated during Measurement Time Slot #4 and is received by both NMU #1 and #2. It is important to note that consecutive Measurement Time Slot positions do not occupy consecutive realtime time slots. Unlike prior art, the present invention permits the synchronization process to be done piecemeal, allowing signalling services to take priority over system maintenance functions.

Figure 6:
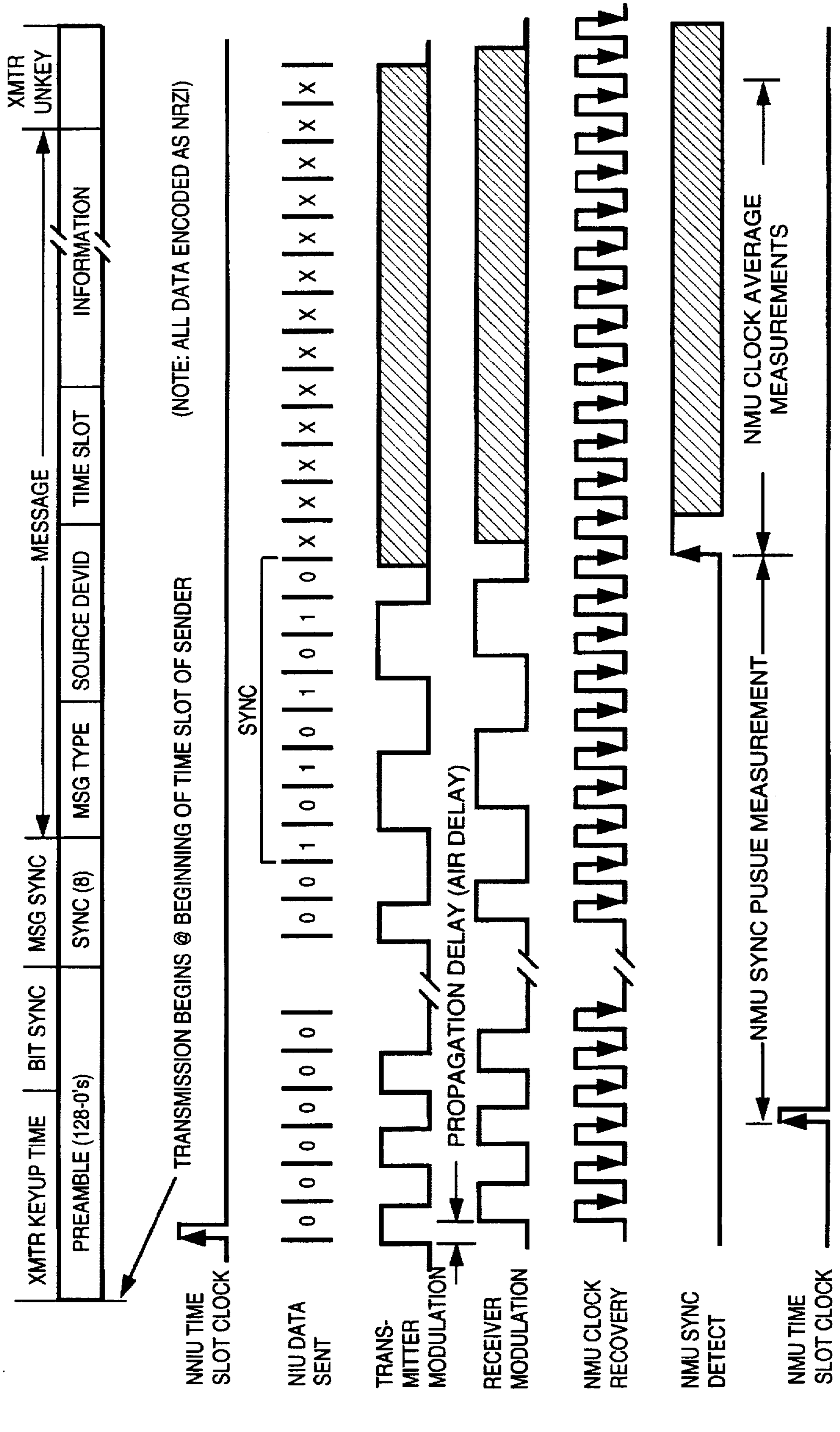
FIG. 6 is a timing diagram for the synchronization measurement data message provided by the preferred embodiment of the present invention.
Figure 8:
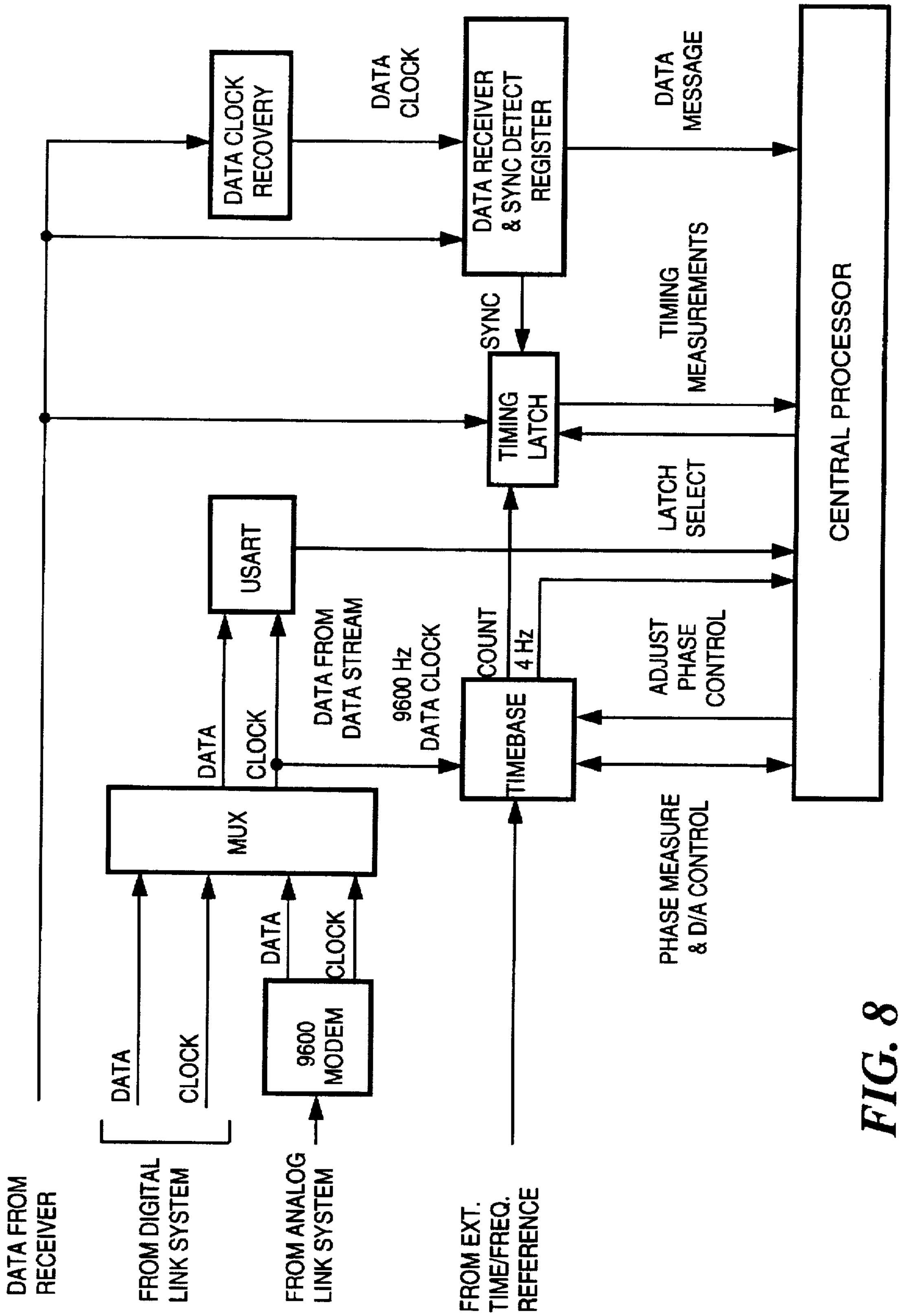
FIG. 8 is a block diagram of the Network Monitor Unit (NMU) provided by the preferred embodiment of the present invention.
Figure 9:
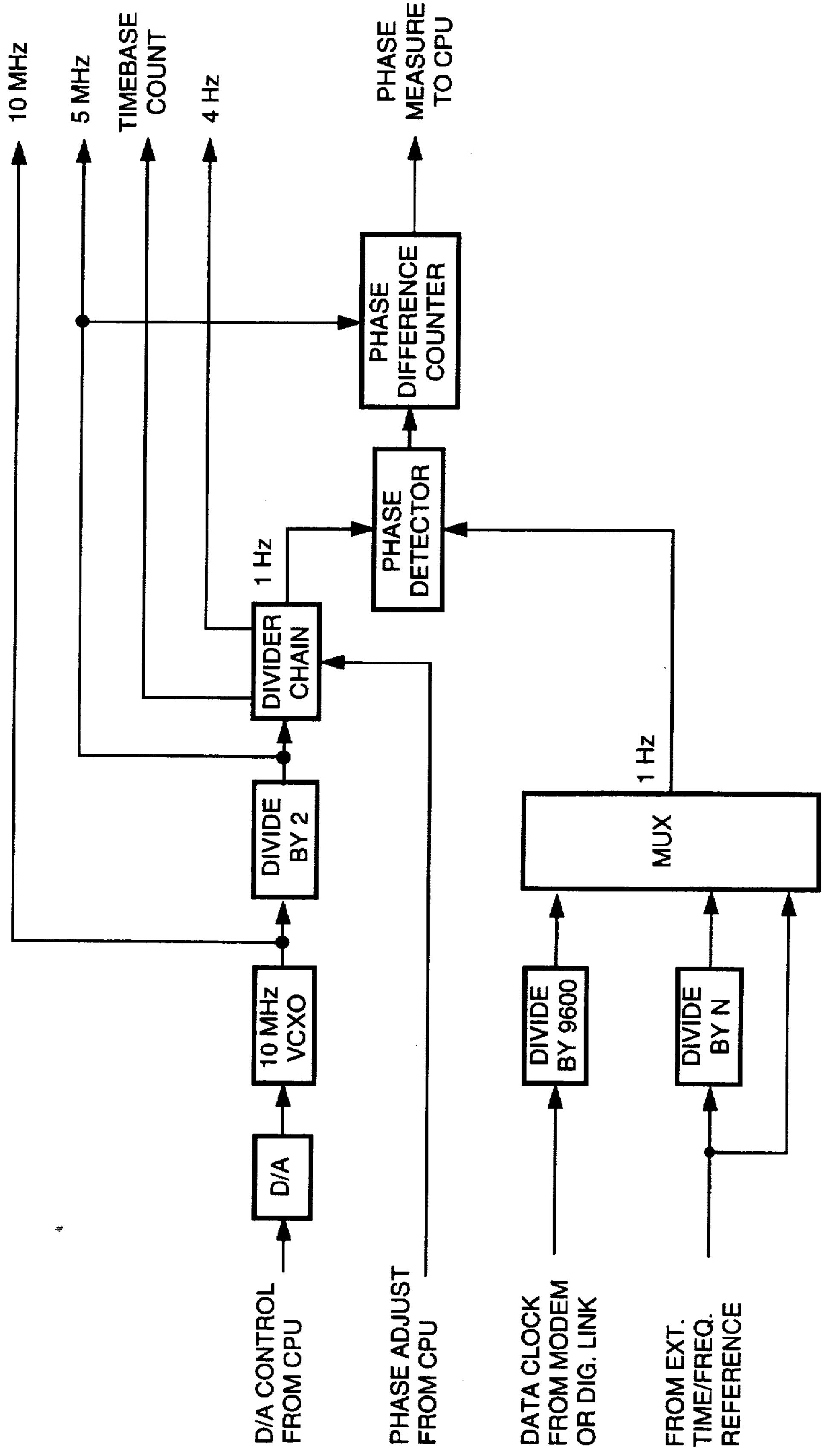
FIG. 9 is a block diagram of the Time base used in the Network Interface Units (NIU) and Network Monitor Units (NMU) provided by the preferred embodiment of the present invention.

The data message used to measure synchronization is shown in FIG. 6. The message is initiated at the beginning of the time slot of the sender. In the preferred embodiment, the entire message is encoded in non-return-to-zero inverted (NRZI) format, although any of a number of encoding schemes could be used. The message is transmitted at a baud rate selected to avoid appearing as valid signalling information normally seen on the channel. In the preferred embodiment, this rate is 1000 bits per second. The message begins with a PREAMBLE of 128 zeros. In NRZI format, this produces alternating binary states for the NMU decoder to acquire bit sync. The length also accommodates transmitter keyup time. The PREAMBLE is followed by an 8-bit SYNC pattern, a Message Type code, the unique Device Identification of the sender, the current Time Slot of the sender and a variable length information field containing a Transmitter Site Status Report. Synchronization measurement is performed in two parts. First, the NMU determines, with respect to its clock, when message SYNC is detected. Ideally, this event should occur 135.5 bit times into the time slot of the sender. Accordingly, this constant time can be subtracted from the actual time measured for the NMU. This single point measurement can have a measurement error of up to ±0.5 bit times due to noise, data clock recovery and various jitter factors. The second measurement is an averaging of data edge times to fine-tune the ambiguity of the first measurement. The accuracy of the measurement is greatly improved by averaging data edge times which occur naturally in the data message. In the preferred embodiment, a block diagram of a circuit for these measurements is shown in FIG. 8. The internal layout of the Timebase shown in FIG. 8 is shown in FIG. 9. Initially, the latch select is set to trigger on SYNC detect. When SYNC is detected, the Timing Latch captures the current Count coming from the Timebase which counts from 0 through 1,249,999 and returns to zero. Upon reading the Timing Latch, the Latch Select is switched to capture on edges of received data. Ideally, these edges would all occur at perfect time boundaries of the baud rate (i.e. 5000). Accordingly, the effective phase difference between an imaginary NMU data clock and the received data clock is determined so that the ambiguous ±0.5 bit SYNC measurement can be adjusted. The present invention is believed to be unique in its method of measurement and use of Transmitter Site Status Report, a useful piece of information, as the synchronization measurement message.

FIG. 10 is a timing diagram of the digital Morse Code generation provided by the preferred embodiment of the present invention. In FIG. 10, the modulation signal sent to the transmitter modulator is shown as representing a short sequence of pulses, or an alternation of logical ones and zeros, constituting a Morse dot. There is then a period of silence during which the data signal may stay at either a high or a low logical level, and there is then a longer period of alternation of logical ones and zeros representing a Morse dash. The intervals of tone and silence are set by the number of data bits in the pattern, and the tone frequency is set by the data transmission rate. This rate is selected so as not to interfere with the normal data signal that is sent on the radio channel.

FIG. 11 is a listing of an NMU Measurement Algorithm and Polynomial and a tabulation of NMU measurements and adjustments. In FIG. 11, a formula relates the SYNC pulse measurement value, which is the location of the sync pulse in the message, and a averaged number of BIT measurements, which are measurements of the positions of the bit edges in the data message, to a correction value for the difference in time between the NMU clock and the timing of the received message.

The present invention improves modulation coincidence and minimizes resynchronization by phase locking the Timebase, used to generate modulation, to a coordinated frequency reference. In essence, once synchronization is achieved, unless the frequency reference is lost, the present invention would never require resynchronization. The preferred embodiment provides three methods for phase locked Timebase operation: the link system data clock, an external frequency/time standard or an NMU-based reference. The Timebase circuit used in the NCU, NIU and NMU is shown in FIG. 9. In essence, the circuit is a classic phase-locked loop where the function of the loop filter is performed by software in the Central Processor. The software permits the phase-locked loop to vary its loop bandwidth dynamically, lock at arbitrary phase, and hold on loss of reference. A digital-to-analog (D/A) converter is provided to drive a 10-MHz voltage-controlled oscillator (VCXO). A Divider Chain provides the timing signals used by the NCU, NIUs and NMUs. The final output of the Divider Chain is a 1-Hz signal which is fed to an edge-sensitive Phase Detector. The other input to the Phase Detector is a multiplexer (MUX) element permitting the selection of various reference signals. The output of the Phase Detector is fed to a Phase-Difference Counter used to measure the phase difference between the local frequency standard signal derived from the VCXO and the selected reference signal. The present invention is unique to synchronized simulcast systems in that the modulation-generating timebase is phase-locked.

With respect to link system data-clock locking, the present invention is unique. Further, in using the link system data clock as a reference, the phase measurements are qualified by proper link system operation through data decoding before phase measurements are actually used to affect loop operation.

The present invention provides the capability for NIUs to phase-lock their timebases to a master NMU which is externally locked to a high-accuracy frequency standard, such as an atomic standard. Operationally, the phase detector for this phase-locked loop becomes the synchronization measurement process. The objective in the system is to have all Timebases operating at the same frequency. The net result of Timebases having different frequencies is that the modulation synchronization will drift apart (i.e. phase shift). In physics, frequency difference, or error, can be expressed as the change in phase divided by the change in time. Therefore, if the Timebases drift over time, the modulation measurement process will result in the issuance of synchronization adjustment commands to the various sites. These adjustment commands can also be used to compute VCXO frequency error so that corresponding D/A adjustments can be made as well.

The present invention provides precise radio transmitter carrier frequency control. As just discussed, the objective with respect to the Timebases for modulation is to have zero frequency difference between Timebases. Similarly, the radio transmitters have as an objective to have zero frequency difference between the references for the synthesizers. Using the phase-locked modulation Timebase as the reference for the radio transmitter synthesizer assures precise frequency control.

The present invention provides efficient radio station identification by concurrently transmitting dissimilar call signs. In most systems, there is a requirement to periodically transmit a call sign in Morse Code. Potentially, every radio transmitter in a system could have a different call sign. In current art, the sending of multiple call signs is accomplished by cascading the various call signs together. This significantly lengthens the amount of time that the system is disabled from communicating. It is not a requirement to simulcast call sign transmissions. In the preferred embodiment of this invention, each NIU is programmed with its own call sign. When it is time to transmit the call signs, the NCU issues a command to all affected NIUs to begin transmission of their individual call signs. All call signs, therefore, are transmitted in the same period of time that it take transmit a single call sign.

The present invention provides for rapid reprogramming of controllers for future software releases. In the preferred embodiment, the NCU, NIUs and NMUs can be remotely reprogrammed in the field. The preferred embodiment provides for the reprogramming of the equipment using the link system. This has the advantage of permitting any addressable device, or devices, on the link system to be simultaneously reprogrammed. This is accomplished by the NCU accepting the reprogramming information, just has it does signalling information, and issuing reprogramming commands to the affected devices. The reprogramming can be done concurrently with other signalling over the link system.

The preceding description is intended to enable the practice of the best mode known to the inventors at the time of filing. It should be taken as illustrative and not as limiting, and the scope of the invention should be extended to the scope of the appended claims and their equivalents.

We claim:

1. An apparatus for effecting simulcast broadcasting of data from a single information source including simultaneous forward synchronization of multiple network interface units in a one way link system, comprising:

a. a source of information;

b. a network control unit connected to the source of information to produce a signal containing data from the source of information and digital identifying information, both clocked from a high-stability local clock reference;

c. a plurality of transmitters each connected to the network control unit to receive the signal from the network control unit and simulcast a radio broadcast containing the signal, with the broadcast synchronized with a timebase derived from phase locking the signal received from the network control unit with a local time base at the transmitters;

d. a network interface unit connected between each of the transmitters and the network control unit, wherein the network interface unit uses the timebase derived from the signal received from the network control unit to regenerate the source of information supplied by the network control unit; and e. a network monitoring unit for monitoring the phase difference between the timebase at the network interface units and a timebase at the network monitoring unit, wherein the timebase at the network monitoring unit is derived from phase locking the signal received from the network control unit with a local time base a the network monitoring unit.

2. The apparatus of claim 1 comprising in addition;

a receiver located to receive the simulcast broadcasts from the plurality of transmitters; and wherein the network monitor unit is coupled to the receiver for receiving information therefrom and coupled to the network control unit to supply information to the network to control the radio simulcast broadcast.

3. The apparatus of claim 1 wherein the source of information is a paging terminal.

4. The apparatus of claim 1 wherein the network monitor unit and the network control unit have timebases, and wherein the timebase of the network monitor unit is phase-locked to the timebase of the network control unit.

5. An apparatus for effecting simulcast broadcasting of signals comprising:

a. a source of information;

b. a clock for providing a master timebase to the apparatus;

c. a network control unit connected to the source of information to produce a signal containing digital identifying information and timing information derived from the clock for broadcast of the signal in a forward link system;

d. a plurality of transmitters each connected to the network control unit to receive the signal from the network control unit and simulcast a radio broadcast containing the signal at a frequency controlled by the timing information, wherein the master timebase of the signal received from the network control unit is phase locked with a local timebase residing at each one of the plurality of transmitters;

e. a network interface unit connected between each of the transmitters and the network control unit;

f. a receiver located to receive the simulcast radio broadcasts; and g. a network monitor unit connected to the receiver and to the network control unit to supply information to the network control unit to control the radio simulcast broadcast, including control of the frequency of the simulcast broadcast to maintain frequency synchronization, wherein a timebase at the network monitoring unit is derived from phase locking a local clock at the network monitoring unit with the master timebase at the network control unit.

6. The apparatus of claim 5 wherein the source of information is a paging terminal.

7. A method of synchronizing in a simulcast broadcasting system, comprising the steps of:

providing a source of information to a network control unit;

producing a signal at the network control unit containing data from the source of information and digital identifying information, providing a produced signal;

clocking the produced signal with a high stability local clock reference at the network control unit providing a clocked link system signal;

providing the clocked link system signal to a plurality of network interface units and transmitters each connected to the network control unit;

phase locking the clocked link system signal with a local oscillator at the network interface units, producing a phase locked clock signal;

monitoring and comparing the phase locked clock signal at a network monitoring unit with another local oscillator at the network monitoring unit;

determining the discrepancy between the phase locked clock signal at the network interface unit with the local oscillator at the network monitoring unit; and sending an adjustment signal to the network control unit in response to the discrepancy found between the phase locked clock signal at one of the network interface units and the local oscillator at the network monitoring unit;

forward synchronizing by the network control unit to the corresponding transmitter having the discrepancy in the network interface unit in response to the adjustment signal received at the network control unit.

8. The method claim 7, wherein the method further comprises the step of phase locking the timebase at the plurality of network interface units with a uniquely identifiable data element in the forward path link signal.

9. The method of claim 7, wherein the method further comprises the step of forward error correction coding for all source information and digital identifying information.

10. The method of claim 9, wherein the method further comprises the step of unobtrusively monitoring the clocked link system signal by decoding the forward error correction coding.

11. The method of claim 7, wherein the method further comprises the step of simultaneously reprogramming the transmitters by transmitting programs with the clocked link system signal.

12. A simulcast broadcasting system, comprising:

a plurality of geographically dispersed radio transmitters providing simultaneous broadcasting of common modulation;

a network controller unit coupled to the geographically dispersed radio transmitters for providing overall control of the simulcast broadcasting system via a link system;

a network monitoring unit having an associated receiver for monitoring each of the plurality of radio transmitters;

a plurality of network interface units forming part of the link system, where each one of the plurality of network interface units reside at each one of the corresponding plurality of geographically dispersed radio transmitters;

a local timebase at the network controller unit, the network interface unit, and the network monitoring unit, wherein the network monitoring unit measures the relative synchronization between the timebase at the network interface units and the timebase at the network monitoring unit and provides an adjustment signal to the network controller unit, forward synchronizing means for synchronizing a given transmitter associated with a given network interface unit in response to the adjustment signal received at the network controller unit.

13. The simulcast broadcasting system of claim 12, wherein the system further comprises a means for forward error correction coding of source information and digital identifying information being provided to the network controller unit.

14. The simulcast broadcasting system of claim 12, wherein the system further comprises means of simultaneously reprogramming the transmitters by transmitting programming signals clocked with the local timebase at the network controller unit.

15. The simulcast broadcasting system of claim 12, wherein the link system allows multiple signaling sources and associated radio transmission facilities to share the link system.

16. A method for synchronizing a broadcast in a simulcast broadcasting system having a plurality of remote transmitters, comprising the steps of:

at a network controller unit:

receiving a source of information from a plurality of inputs;

clocking the source of information with a high stability clock reference to provide clocked information to the plurality of remote transmitters;

sending adjustment commands during a maintenance cycle to the remote transmitters after one of a plurality of network monitoring units detects a phase difference between a timebase at the network monitoring unit and a timebase at one of the remote transmitters, wherein the timebase at the remote transmitters and the network monitoring units are each individually derived from the high stability clock reference at the network controller unit;

at each of plurality of network monitoring units:

monitoring and measuring synchronization between the timebase at one of the plurality of remote transmitters in a non-simulcast, non-interfering basis, wherein measurements are taken by assigned measurement time slots; and sending an adjustment signal to the network controller unit in response to the detection of the phase difference between the timebase at the network monitoring unit and the timebase at the transmitter being monitored, wherein the network controller unit sends the adjustment command to the transmitter being monitored in response to the adjustment signal from the network monitoring unit.

17. The method of claim 16, wherein the step of measuring synchronization is performed in a piecemeal manner, allowing for signalling services to take priority over system maintenance functions.

18. The method of claim 16, wherein the step of measuring synchronization further includes the step of sending a data message containing a transmitter site status report.

19. The method of claim 18, wherein the step of measuring synchronization comprises the steps of:

a) measuring of the time of reception as measured by the timebase at the network monitoring unit; and b) refining of the measuring of the time of reception by averaging data edge transitions which occur naturally in the data message.

20. The method of claim 16, wherein the method further comprises the step of concurrently transmitting dissimilar call signs by the plurality of remote transmitters including the steps of:

a) programming each of a plurality of network interface units each correspondingly associated with each of the plurality of remote transmitters with an individual call sign;

b) signalling by the network controller units to the network interface units to simultaneously transmit their individual call signs.

21. An apparatus for effecting simulcast broadcasting of data, comprising:

a source of information;

a network control unit, having a high-stability timebase, coupled to the source of information to produce a signal containing data and digital identifying information, the signal clocked from the high-stability timebase; and a plurality of transmitters, each coupled to the network control unit to receive the signal, and each having a modulation-generating timebase, each modulation-generating timebase phase locked to the high-stability timebase by way of synchronization information included in the signal, and each modulation-generating timebase adjusted by a corresponding correction value provided by the network control unit, thereby providing a highly accurate coincident modulation of the plurality of transmitters during a radio broadcast containing the signal.

22. The apparatus as recited in claim 21, further comprising:

a receiver; and a network monitor unit, coupled to the receiver for receiving the radio broadcast and coupled to the network control unit for receiving the signal, the network monitor unit having a timebase phase locked to the high-stability timebase, the network monitor unit programmed to:

measure a phase difference between timing of the radio broadcast containing the signal transmitted by a corresponding one of the plurality of transmitters, and timing of the signal received from the network control unit, and deliver the phase difference to the network control unit for producing the corresponding correction value of the corresponding one of the plurality of transmitters.

23. The apparatus as recited in claim 21, further comprising a network interface unit coupled between each of the plurality of transmitters and the network control unit, wherein the network interface unit uses the synchronization information included in the signal to regenerate the source of information supplied by the network control unit.

24. A method for effecting simulcast broadcasting of data, comprising the steps of:

providing a source of information for a network control unit;

synchronizing the network control unit to a high stability timebase;

generating a signal, at the network control unit, containing data and digital identifying information, the signal clocked by the high-stability timebase;

providing to a plurality of transmitters the signal, the plurality of transmitters each having a modulation-generating timebase;

phase locking, at the plurality of transmitters, each modulation-generating timebase to the high-stability timebase by way of synchronization information included in the signal; and adjusting each modulation-generating timebase by a corresponding correction value provided by the network control unit, thereby providing a highly accurate coincident modulation of the plurality of transmitters during a radio broadcast containing the signal.

25. The method as recited in claim 24, further comprising the steps of:

generating demodulation information from a receiver for receiving the radio broadcast;

providing the demodulation information to a network monitor unit;

providing the network monitor unit the signal, the network monitor unit having a timebase phase locked to the high-stability timebase by way of synchronization information included in the signal;

measuring, at the network monitor unit, a phase difference between timing of the radio broadcast containing the signal transmitted by at least one of the plurality of transmitters, and timing of the signal received from the network control unit; and delivering the phase difference to the network control unit for producing the corresponding correction value of the corresponding one of the plurality of transmitters.

26. The method as recited in claim 24, further comprising the step of regenerating the source of information supplied by the network control unit by way of a network interface unit coupled between each of the plurality of transmitters and the network control unit that uses the synchronization information included in the signal.

* * * * *